United States Patent
Amano

Patent Number: 5,815,753
Date of Patent: Sep. 29, 1998

[54] CAMERA HAVING A MAGNETIC INFORMATION RECORDING APPARATUS AND RECORDING CONTROL MEANS

[75] Inventor: Kenichiro Amano, Kawasaki, Japan

[73] Assignee: Canon Kabushiki Kaisha, Tokyo, Japan

[21] Appl. No.: 904,447

[22] Filed: Jul. 31, 1997

Related U.S. Application Data

[63] Continuation of Ser. No. 443,271, May 17, 1995, abandoned.

[30] Foreign Application Priority Data

May 23, 1994 [JP] Japan .................................. 6-130808

[51] Int. Cl.$^6$ .................................................. G03B 17/24
[52] U.S. Cl. ........................................................... 396/319
[58] Field of Search ............................. 396/310, 311, 396/319, 320

[56] References Cited

U.S. PATENT DOCUMENTS

| | | | |
|---|---|---|---|
| 4,733,263 | 3/1988 | Taniguchi et al. | 354/419 |
| 4,760,413 | 7/1988 | Taniguchi et al. | 354/106 |
| 5,060,006 | 10/1991 | Taniguchi et al. | 354/419 |
| 5,272,598 | 12/1993 | Wakabayashi | 354/105 |
| 5,293,189 | 3/1994 | Taniguchi et al. | 354/21 |
| 5,396,305 | 3/1995 | Ogawa | 354/76 |

FOREIGN PATENT DOCUMENTS

| | | |
|---|---|---|
| 2-149835 | 6/1990 | Japan . |
| 3-171038 | 7/1991 | Japan . |
| 3-264932 | 11/1991 | Japan . |
| 4-178637 | 6/1992 | Japan . |
| 4-220630 | 8/1992 | Japan . |
| 5-19345 | 1/1993 | Japan . |
| 5-053188 | 3/1993 | Japan . |
| 5-72610 | 3/1993 | Japan . |
| 5-158128 | 6/1993 | Japan . |

*Primary Examiner*—Safet Metjahic
*Assistant Examiner*—Nicholas T. Tuccillo
*Attorney, Agent, or Firm*—Fitzpatrick, Cella, Harper & Scinto

[57] ABSTRACT

The present invention relates to a camera for performing magnetic recording in a magnetic track on a film. In such a camera, the type of the film is judged, and data necessary for printing is prohibited from being recorded when the film is a positive.

20 Claims, 11 Drawing Sheets

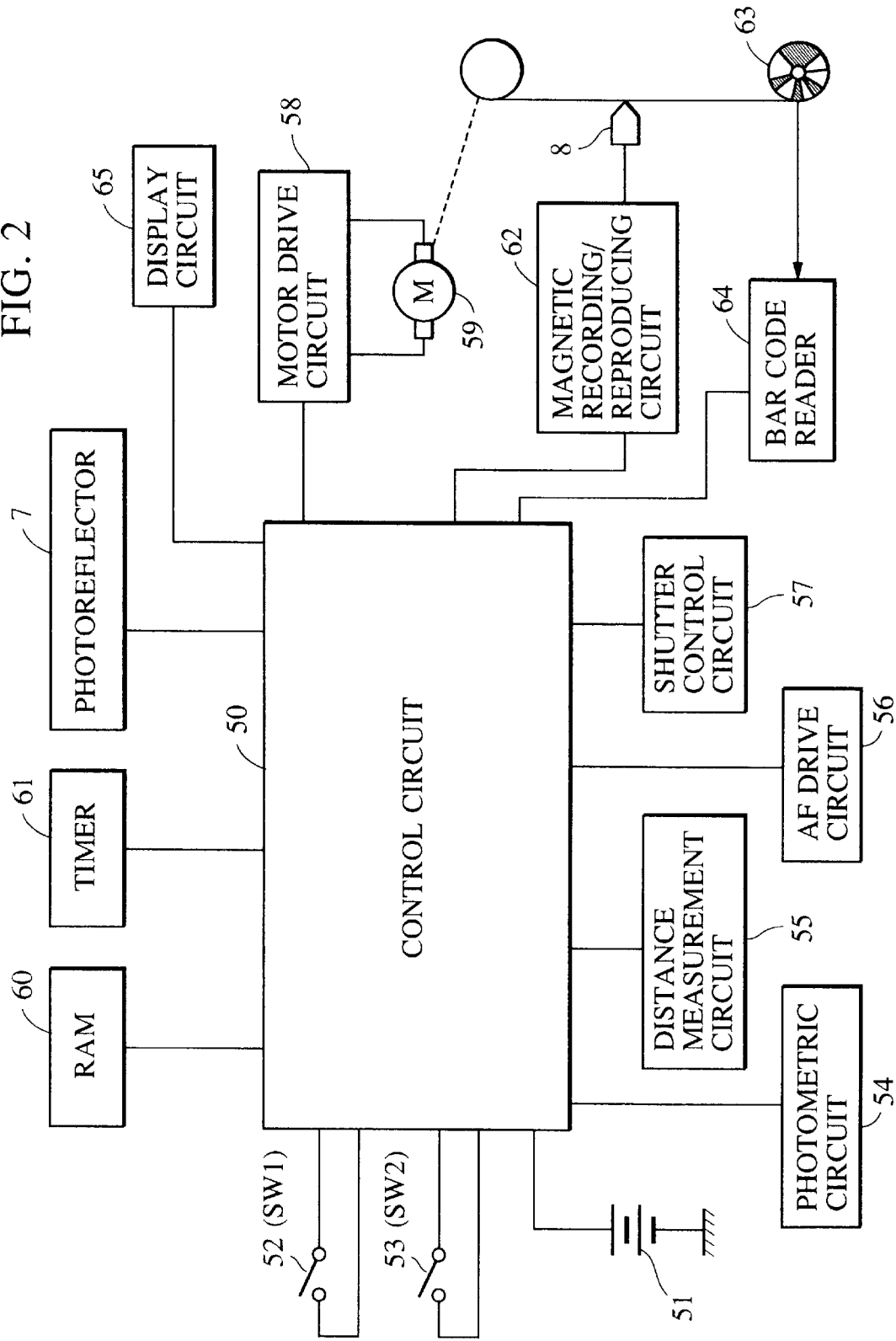

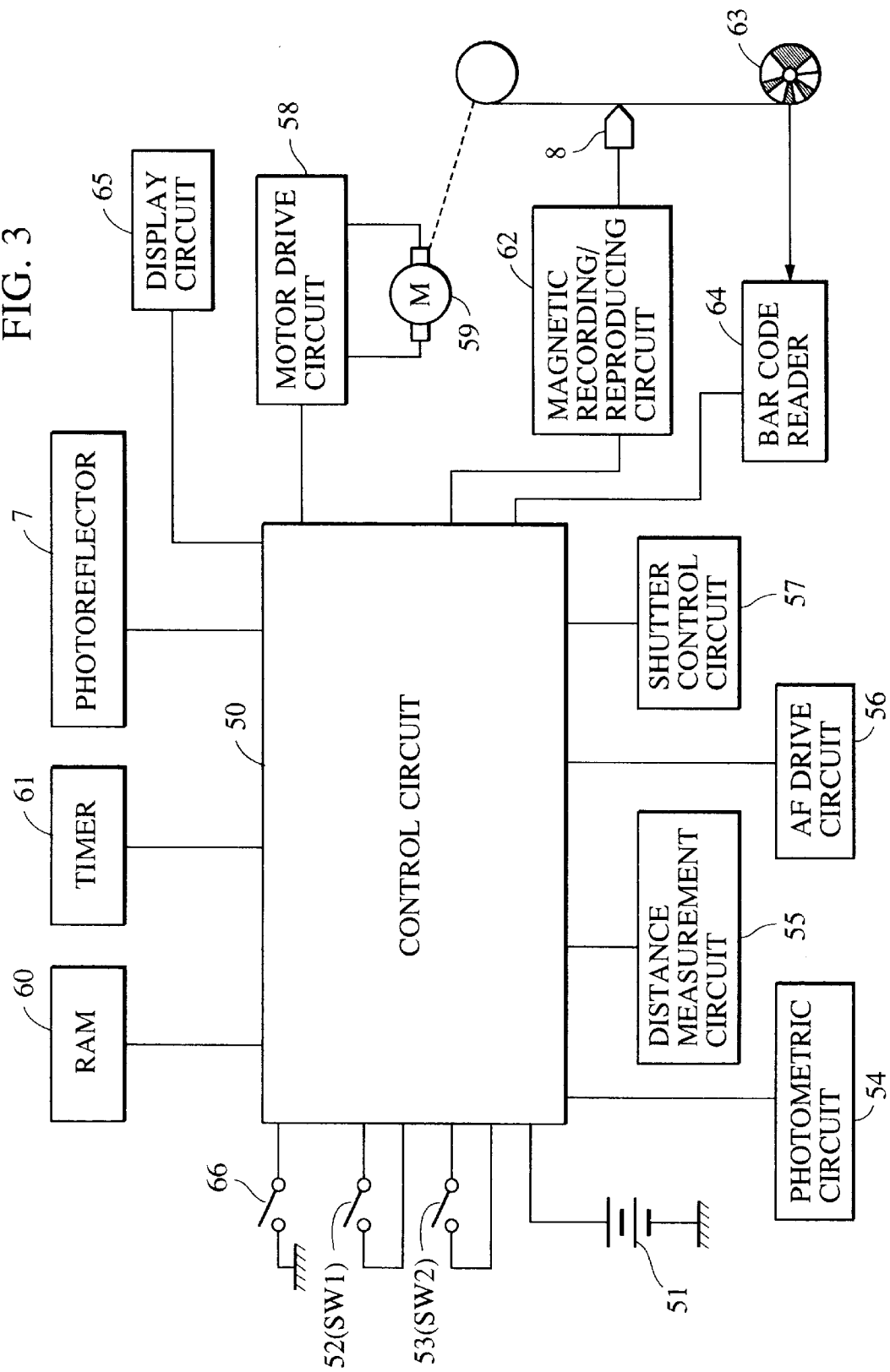

| FIG. 4A | FIG. 4B |

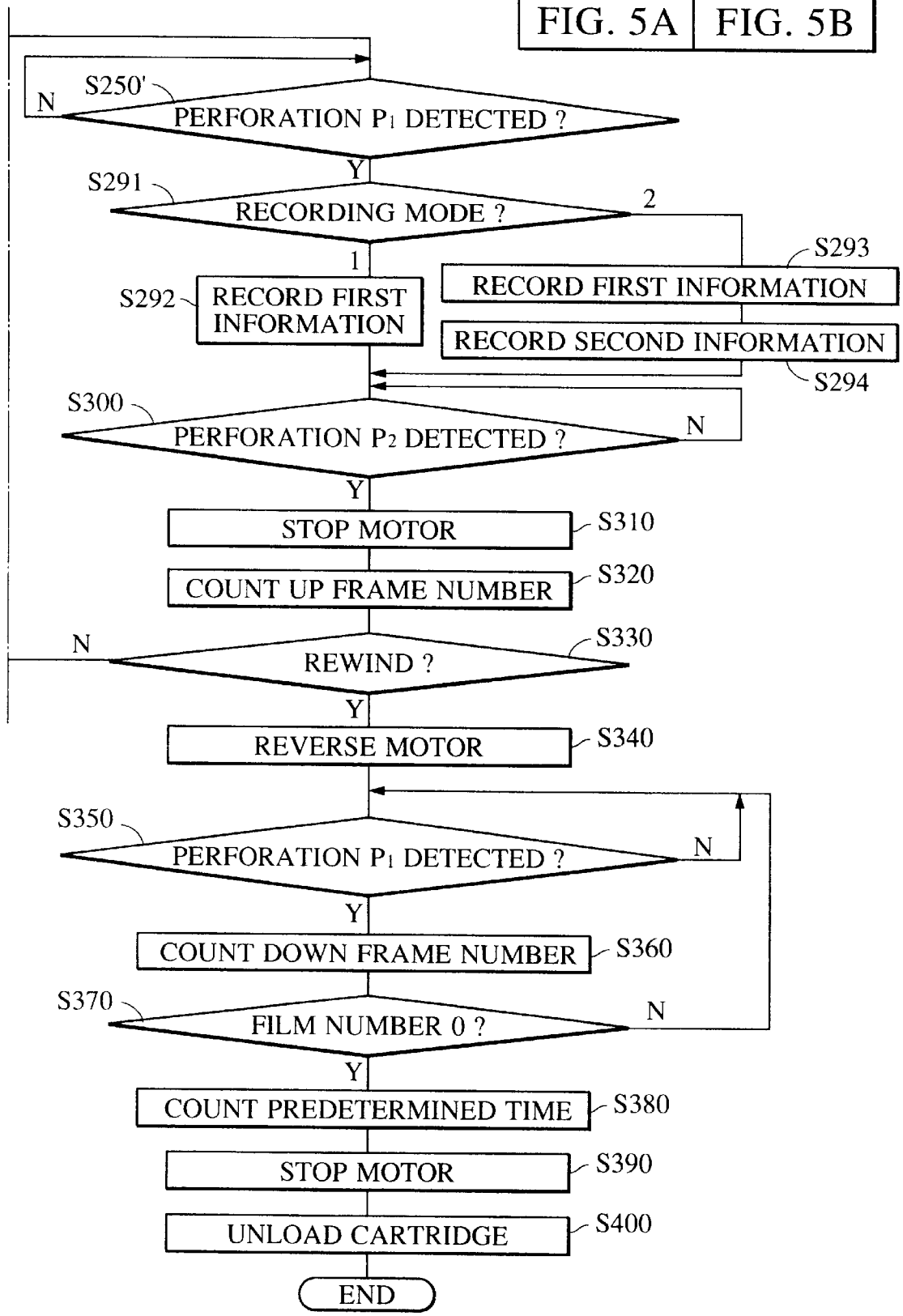

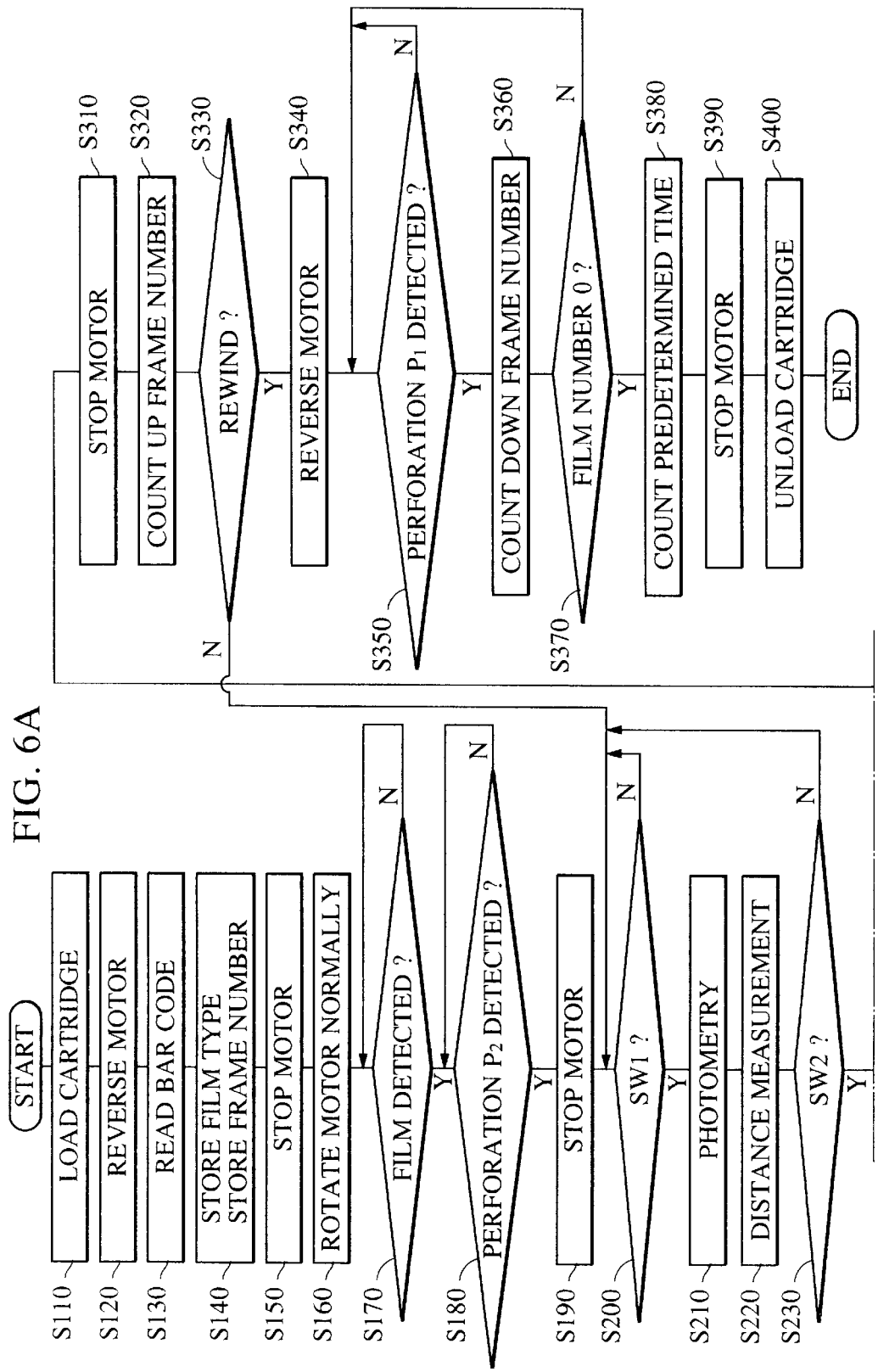

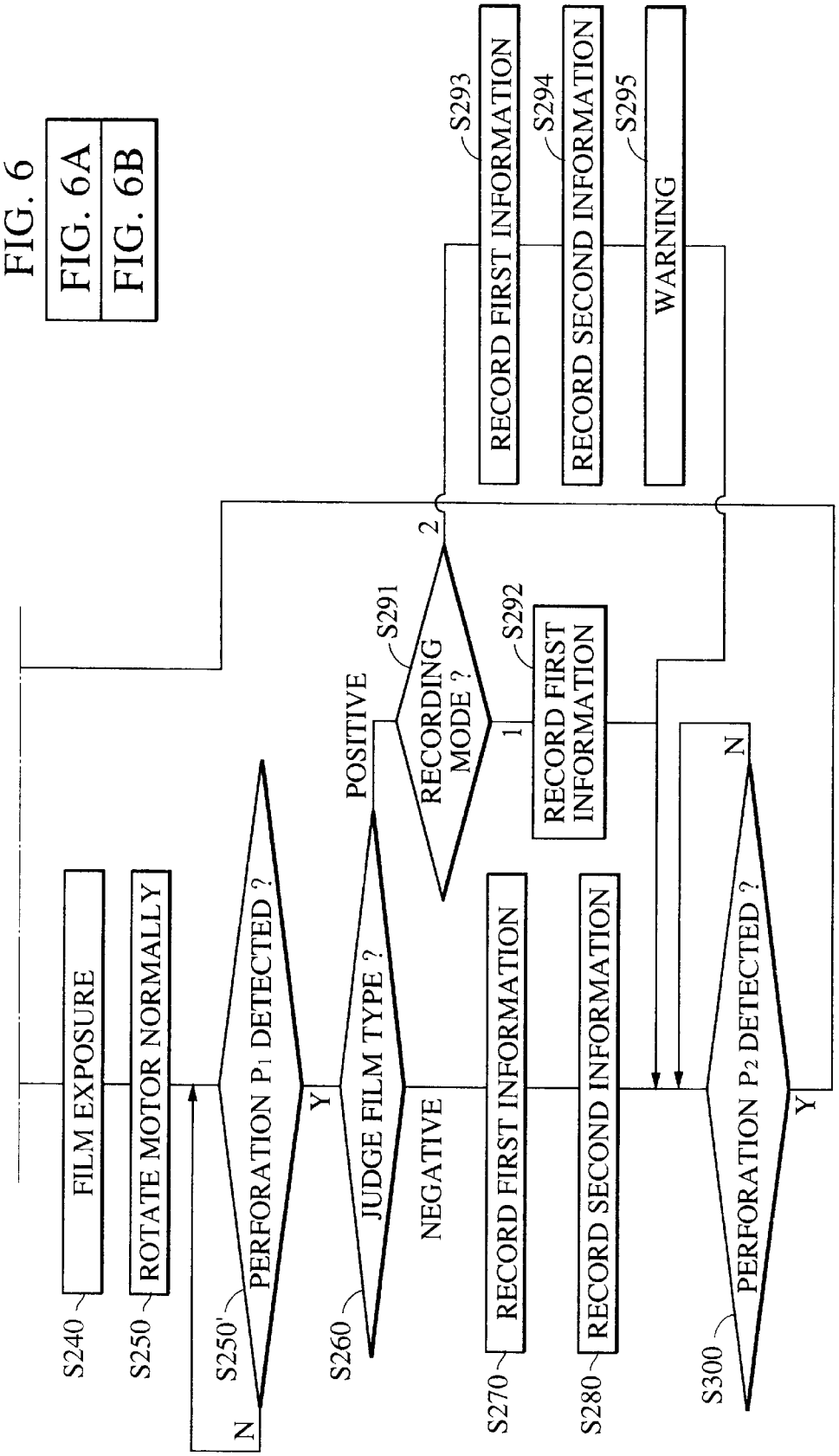

FIG. 7(A)

| START | ID="1" | DATA, TIME, TITLE | ID="2" | PRINT NUMBER, TOP/BOTTOM, FLASH ON/OFF, BV | ID="2'" | MAGNIFICATION, LIGHT SOURCE | END |

FIG. 7(B)

| START | ID="1" | DATA, TIME, TITLE | END |

FIG. 7(C)

| START | ID="1" | DATA, TIME, TITLE | ID="2" | PRINT NUMBER, TOP/BOTTOM, FLASH ON/OFF, BV | ID="1'" | TV, AV, EXPOSURE COMPENSATION | END |

FIG. 7(D)

| START | ID="1" | DATA, TIME, TITLE | ID="1'" | TV, AV, EXPOSURE COMPENSATION | END |

CAMERA HAVING A MAGNETIC INFORMATION RECORDING APPARATUS AND RECORDING CONTROL MEANS

This application is a continuation of application Ser. No. 08/443,271 filed May 17, 1995, now abandoned.

BACKGROUND OF THE INVENTION

1. Field of the Invention

The present invention relates to information recording in a camera capable of detecting the type of film.

2. Description of the Related Art

Japanese Patent Laid-Open No. 2-149835 suggests a camera having a means for selecting the mode of information recording and means capable of changing the amount of information to be used.

Further, Japanese Patent Laid-Open No. 3-264932 suggests a camera which automatically sets various camera modes according to a signal of a cartridge.

Still further, Japanese Patent Laid-Open No. 4-220630 suggests a camera which reads negative/positive information of a film and carries out exposure compensation for AE based on the read information.

The above-mentioned first prior art reference requires the user to select the mode of information recording. The selection is troublesome and recording of unnecessary information may be selected by mistake.

The above second and third prior art reference each read out a signal of a cartridge, and set the mode of the camera or perform exposure compensation according to the signal. The art references do not disclose a change of the information recording mode.

Japanese Patent Laid-Open No. 3-171038 discloses a camera which identifies a recording medium, detects the information recording capacity of the recording medium, divides the information recording capacity into predetermined recording areas, and records characteristic information in the recording areas.

Cameras for changing the characteristics of a magnetic reproduction circuit and the feeding speed in accordance with the type of film are disclosed in Japanese Patents Laid-Open Nos. 5-19345, 5-72610, and 5-158128.

SUMMARY OF THE INVENTION

One aspect of the application is to provide a camera which determines the type of film, used, for example, negative (first type) or positive (second type), and prohibits unnecessary information from being recorded according to the type of the film, thereby efficiently using a recording area.

One aspect of the application is to provide a camera which gives a warning when recording of unnecessary information on a positive film type is selected to allow a user to easily recognize the information recording as unnecessary for the positive film type.

One aspect of the application is to provide a camera which can select unnecessary information recording on a positive film type when a user recognizes the value of the information recording as a data recording even if the information recording is unnecessary for printing.

One aspect of the application is to provide a camera comprising a recording head for writing information into a magnetic storage area provided on a film, a writing control means for controlling writing into each frame by the recording head, and a film type reading means for reading the type of the film, wherein first and second information groups are recorded when the film is determined to be of a first type, and only the first information group is recorded when the film is determined to be of a second type.

One aspect of the application is to provide a camera which gives a warning when the film is determined to be of the second type and recording of the second information group is selected.

One aspect of the application is to provide a camera which has a first mode for recording a first information group and a second information group and a second mode for recording only the second information group. This allows a user to select the first or second mode of information recording only on a positive film type.

Other objects of the present invention will become more apparent from the following description of the preferred embodiments taken in conjunction with the accompanying drawings.

BRIEF DESCRIPTION OF THE DRAWINGS

FIG. 2 is a block diagram showing the general structure of the camera shown in FIG. 1;

FIG. 3 is a block diagram showing the general structure of the camera shown in FIG. 1;

FIG. 6 comprises FIGS. 6A and 6B and is a flowchart showing the operation of a third embodiment of the present invention;

FIGS. 7A, 7B, 7C, and 7D are illustrations showing an example sequence of information recording.

DESCRIPTION OF THE PREFERRED EMBODIMENTS

A detailed description of preferred embodiments of the present invention will now be given in conjunction with the accompanying drawings.

Figure 1:
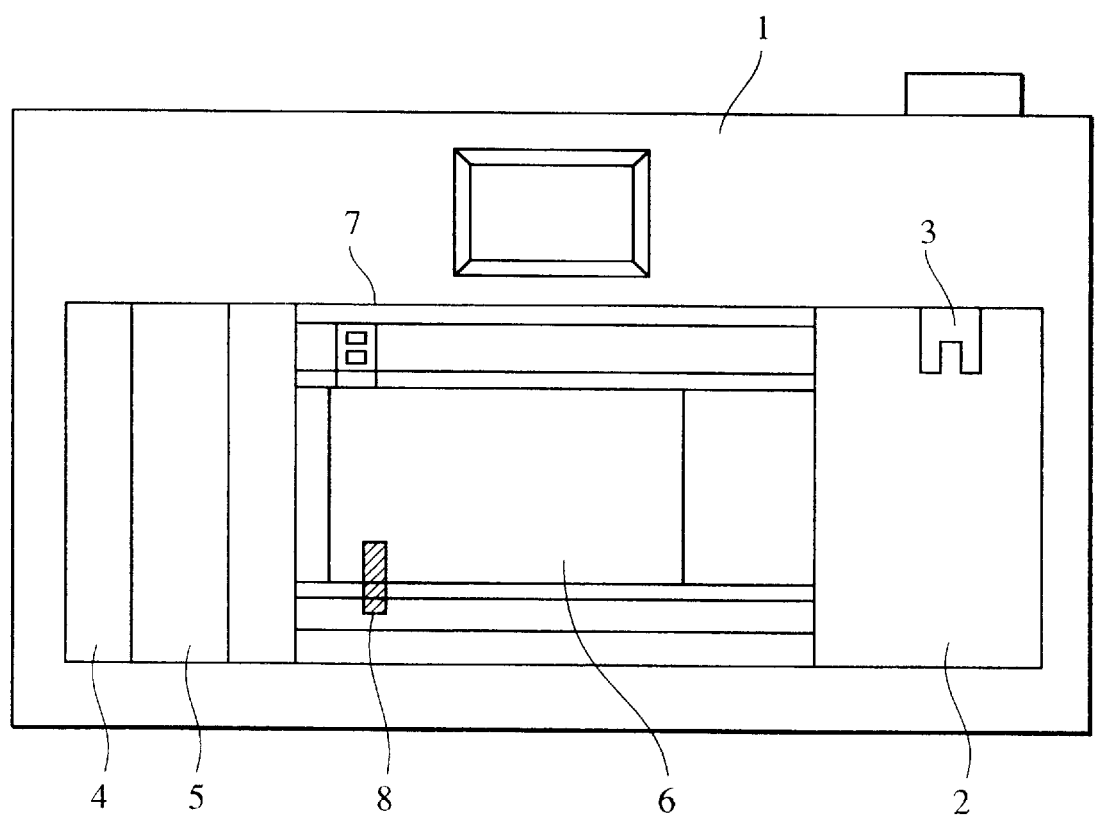
FIG. 1 is a rear view of a camera according to a first embodiment of the present invention, from which a rear cover is detached.

FIG. 1 is a rear view of a camera according to a first embodiment of the present invention, from which a rear cover is detached.

Referring to FIG. 1, the camera comprises a main body 1, a cartridge chamber 2, a fork 3, a spool chamber 4, a film wind spool 5, an aperture 6 where a film is exposed, a photoreflector 7 which is, as shown in FIG. 1, located on the upper left of the camera as viewed from the rear side, that is, between a frame to be exposed and the next frame to sense perforations of the film, and a magnetic recording head 8 for performing information recording in close contact with a magnetic layer of the film.

Figure 8:
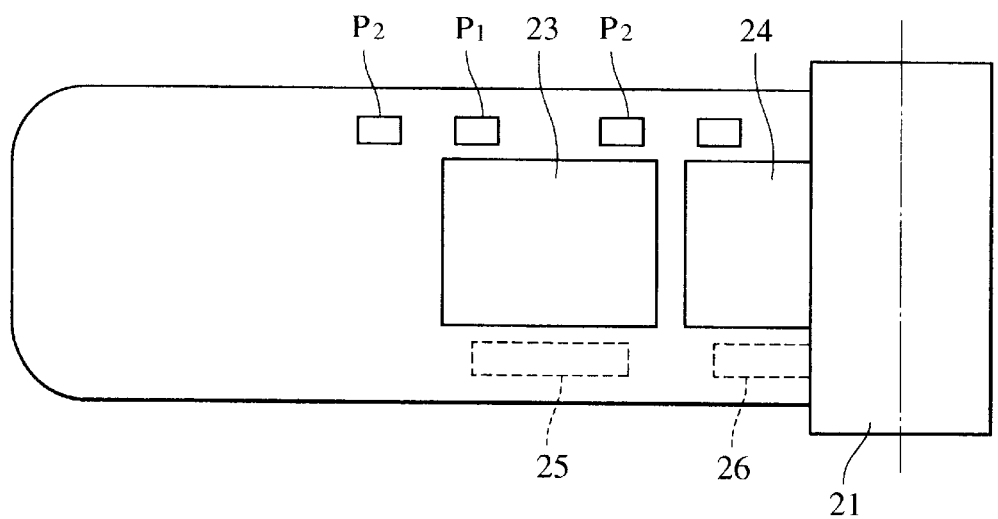
FIG. 8 is a view showing film in a film cartridge used in the present invention.

FIG. 8 shows a film cartridge to be used in the camera of the present invention. A cartridge 21 is given a bar code, which will be described later, on the top surface thereof. Frames 23 and 24 of a film are respectively provided with magnetic tracks 25 and 26 and respective corresponding perforations $P_1$ and $P_2$.

FIG. 2 is a block diagram showing the circuit configuration of the camera according to the first embodiment of the present invention. The camera comprises a control circuit 50 (for example, a microcomputer) for controlling the circuits in the camera, a battery 51 as a power supply, a switch (SW1) 52 to be turned on by a first stroke of a release button, a release switch (SW2) 53 to be turned on by a second stroke of the release button, a photometric circuit 54 for measuring the subject brightness, a distance measurement circuit 55 for measuring the distance from the camera to the subject, an AF drive circuit 56 for controlling the focus of a taking lens, which is not shown, based on information from the distance measurement circuit 55, a shutter control circuit 57 for controlling the opening and closing of a shutter, a motor (M) drive circuit 58 for driving a film feeding motor 59 in a film wind direction by normal rotation thereof and in a film rewind direction by reverse rotation thereof, a RAM 60, a timer 61, a magnetic recording/reproducing circuit 62 for writing and reading information to and from a film, a bar code reader 64 for reading the recording type of the film and number of frames from a bar code 63 on the film cartridge, and a display circuit 65 for indicating the shutter speed (TV) and the aperture value (AV), or an error in the magnetic recording circuit.

In FIG. 3, the same components as those in FIG. 2 are denoted by the same numerals. A mode selection switch 66 for manually selecting the information recording mode when using a positive film is additionally provided to be used in second and third embodiments which will be described later.

Figure 4A:
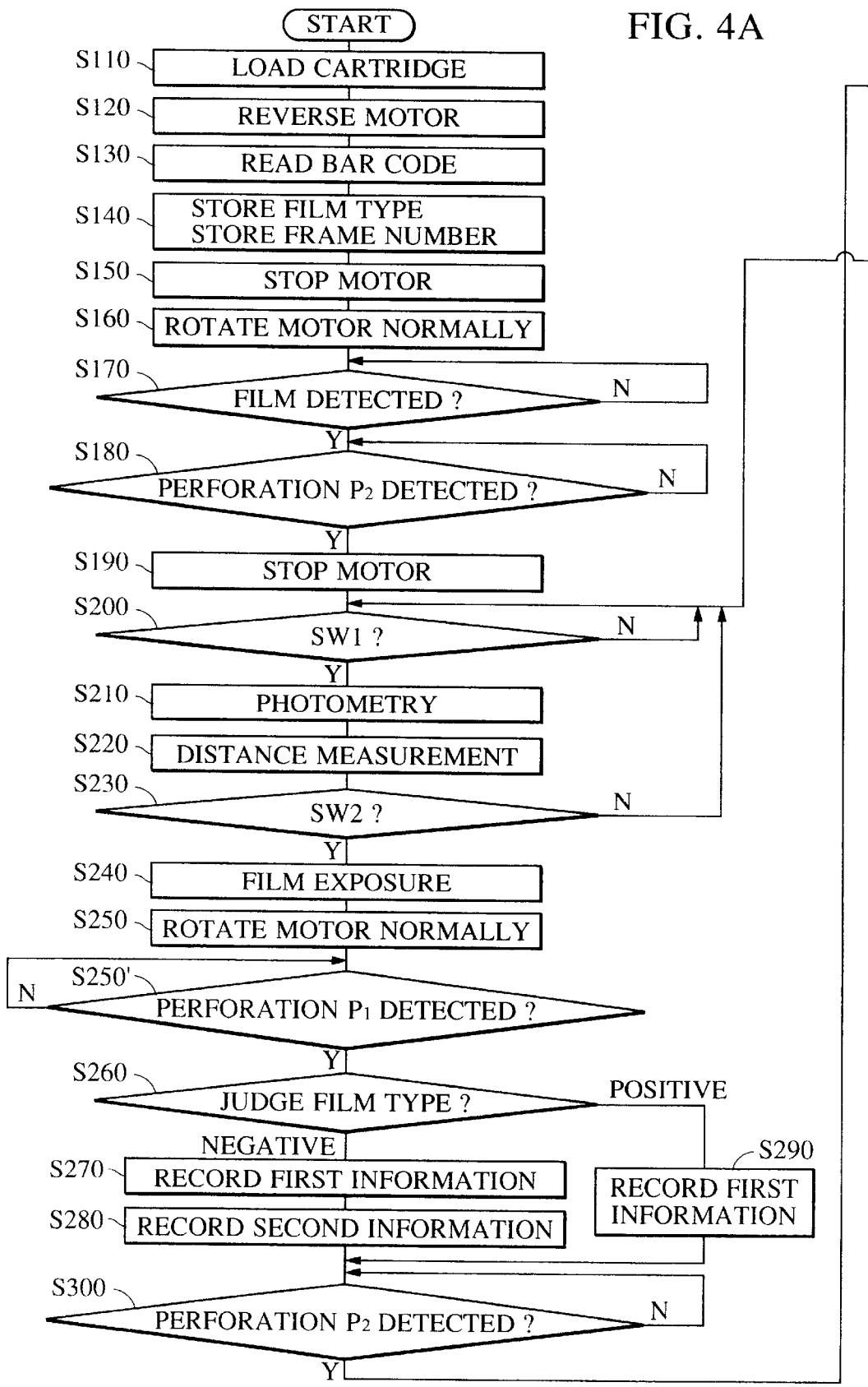
FIG. 4 comprises FIGS. 4A and 4B and is a flowchart showing the operation of the first embodiment of the present invention.
Figures 4, 4B:
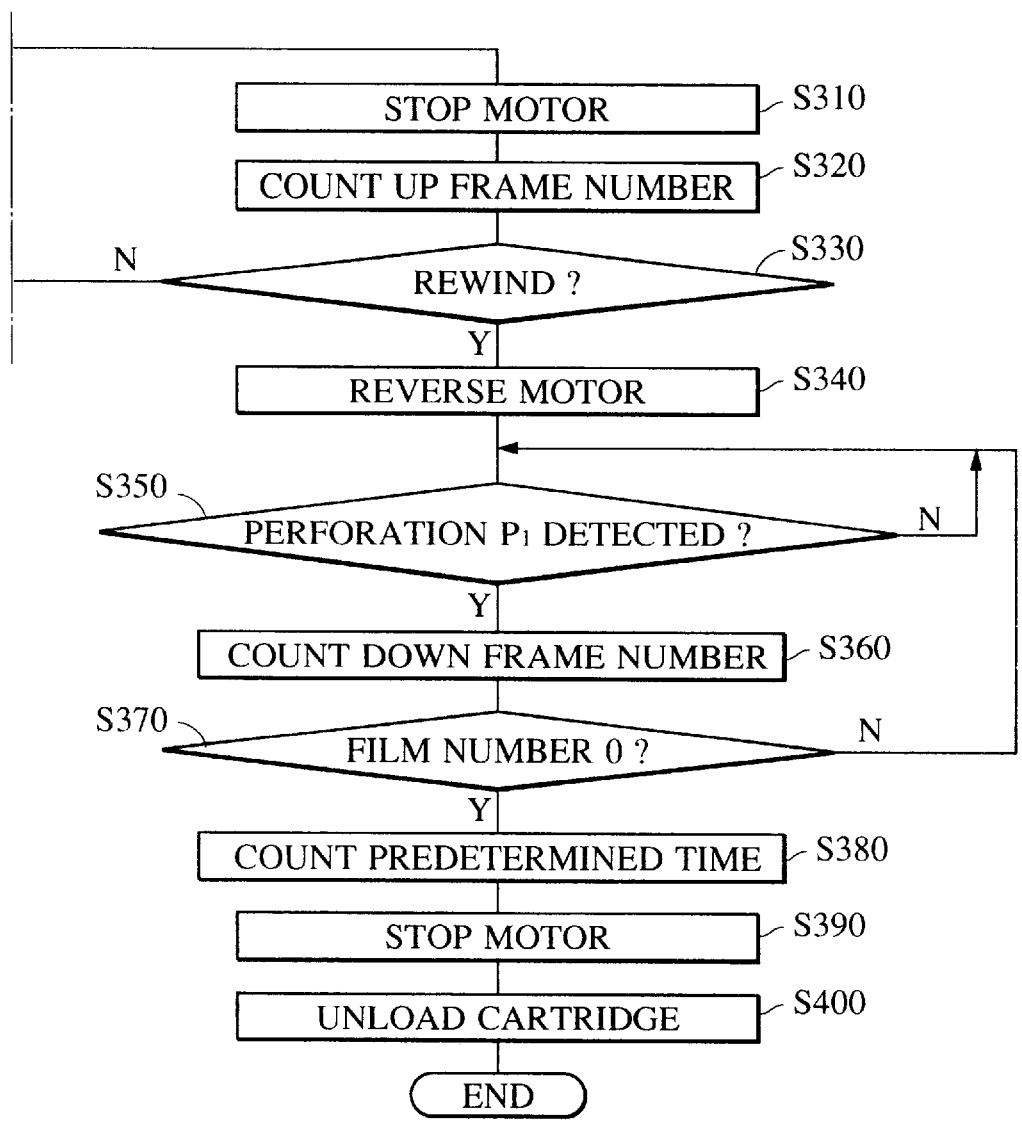

FIG. 4 is a flow chart showing the operation of the microcomputer 50 in the first embodiment. Steps in the following processing are abbreviated as "S".

When a cartridge is loaded in S110, the motor is reversely rotated through the motor drive circuit 58 in S120 and the driving in the rewind direction is started. The bar code information 63 on the cartridge is read out by the bar code reader 64 in S130, and the type of film (negative or positive) and the maximum number of frames to be exposed are stored (S140). The motor is stopped in S150, and driving in the rewind direction finished. After that, the driving in the wind direction starts by rotating the motor normally in S160. When the leading end of the film passes the perforation sensor (photoreflector) 7 in S170 and a perforation (the first perforation $P_2$ in FIG. 8) is detected in S180, the motor is stopped in S190, and preparation for the exposure of the first frame is complete. If the light and distance measurement detection switch (SW1) is depressed in S200, photometry is carried out by the photometric circuit 54 in S210 to determine shutter and aperture control values. A decision measurement is carried out by the distance measurement circuit 55 in S220, and the measurement result is reflected in focusing performed by the AF drive circuit 56. A decision is made as to whether or not the exposure start switch SW2 (53) is depressed, and if not, the processing returns to S200. If it is depressed, the shutter control circuit 57 is operated in S240 to perform film exposure. When the film exposure is complete, the motor is normally rotated in S250 to start film winding. When a perforation $P_1$ is sensed by the photoreflector 7 in S250', the type of the film stored in S140 is judged in S260. If the film is a negative film type, a signal corresponding to the first information is supplied to the magnetic recording head 8 and the first information is recorded on the track 25 of the frame in S270. The first information mainly consists of information representing the photographing state, such as date, time, and comments (e.g., title), as shown in Table 1. Next, a signal corresponding to the second information is supplied to the head 8 and the second information is recorded on the track 25 of the frame in S280. The second information mainly consists of useful information for a machine used in printing, such as the print number, the type of a light source, and the ON/OFF status of a flash, and is used for quality enhancement and rationalization in printing. For example, second information can be used for determining the photometric range of a negative in printing based on top/bottom read information and magnification information, or selecting an algorithm for printing based on information about ON/OFF status of the flash, the brightness (BV), and the light source. On the other hand, only the first information is recorded in S290 when positive film type is used.

After that, if passage of the perforation $P_2$ is detected in S300, the above information recording is finished, the motor is stopped in S310, and the winding of one frame is completed. The number of frames is counted up by one in S320, and a decision is made in S330 as to whether the counted number exceeds the maximum number of exposed frames stored in S140. If not, the processing returns to S200, and photographing is continued. On the other hand, if the number exceeds the maximum number of frames, the motor is reversely rotated in S340, and feeding in the rewind direction is started. Every time when the perforation $P_1$ is detected in S350, the frame number is counted down by one in S360. The counting-down continues until the frame number falls to zero. When the frame number is zero, the timer 61 counts to a predetermined time to rewind the film into the cartridge in S380, and then, the motor is stopped in S380, thereby completing the film rewinding.

Figure 5A:
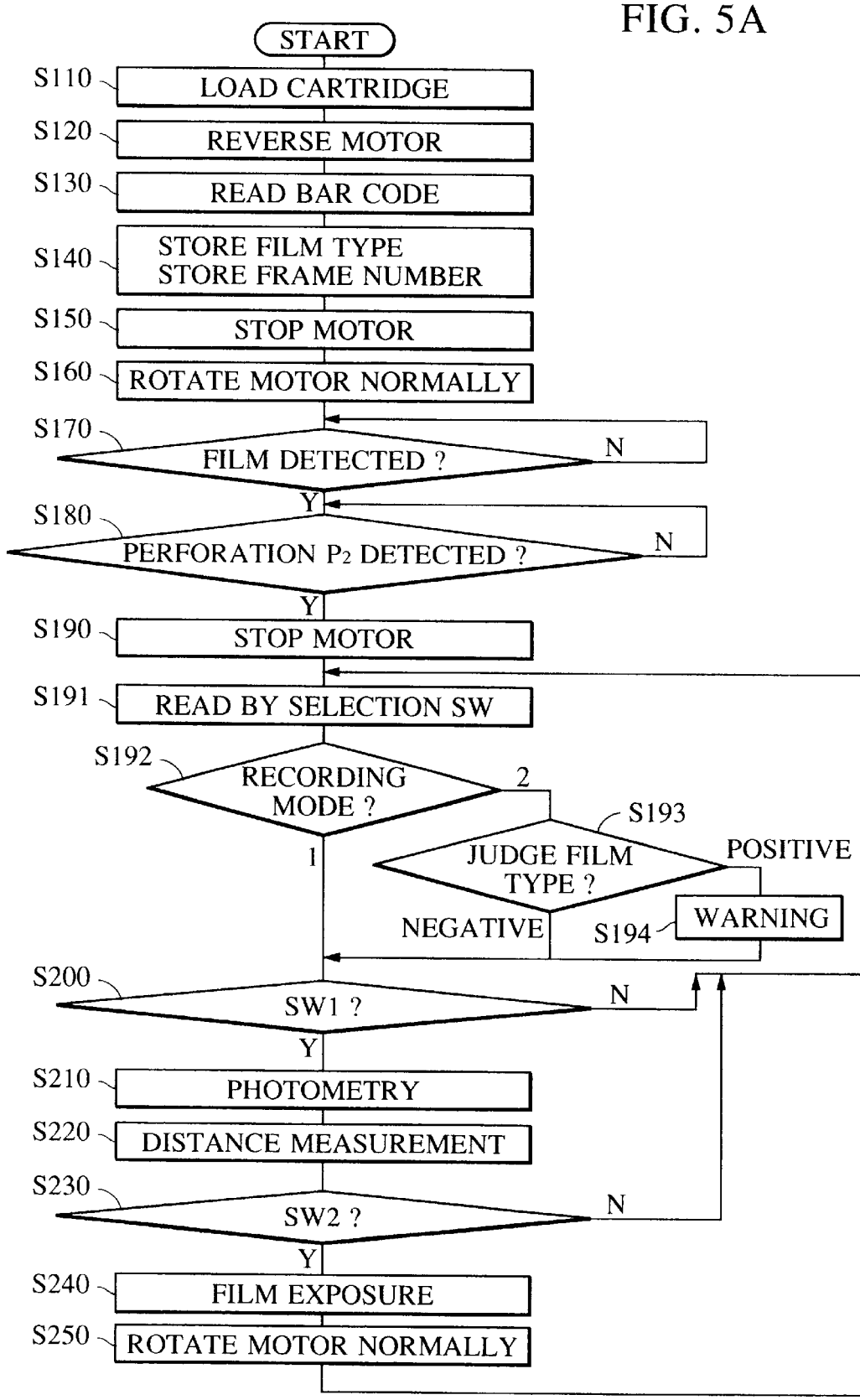
FIG. 5 comprises FIGS. 5A and 5B and is a flowchart showing the operation of a second embodiment of the present invention.

FIG. 5 is a flow chart showing the operation of a second embodiment of the present invention. The same operations as those in the first embodiment are denoted by the same numerals, and therefore, only different operations will be described. The circuit configuration shown in FIG. 3 is used in the second embodiment.

The information recording mode is read by the mode selection switch 66 in S191, and the recording mode is determined in S192. If a first recording mode is selected, the processing proceeds to S200. If a second recording mode is selected, when the film is judged to be a negative film type in S193, the processing also proceeds to S200. Only when the second recording mode is selected and the film is judged to be a positive film type is a warning given by, for example, flashing a display using the display circuit 65. These judgments are continued until the SW1 is depressed in S200. The return step for S200, S230 and S330 is S191. When it is judged by the mode selection switch 66 in S291 that the first recording mode is selected, the first information mainly including information showing the photographing state is recorded in S292, and the second information mainly including information useful for printing is not recorded. On the other hand, when the second recording mode is selected, the first information and the second information are respectively recorded in S293 and S294, and the processing proceeds to S300 and subsequent steps.

In this embodiment, the mode selection switch 66 is used to choose between the recording of only the first information regardless of the type of the film or the recording of the first and second information.

FIG. 6 is a flow chart showing the processing in a third embodiment of the present invention. The same steps as in the first embodiment are denoted by the same numerals, and only different steps will be only described below. This flow is carried out by the camera having the circuit configuration shown in FIG. 3.

When the film is judged to be a positive type in S260, the information recording mode is read out by the mode selection switch 66 in S291 and the recording mode is judged. If the first recording mode is selected, the first information, mainly consisting of information showing the photographing state, is recorded in S292, and the second information, mainly consisting of information useful for printing, is not recorded. On the other hand, when the second recording mode is selected, the first information and the second information are respectively recorded in S293 and S294. A warning is given in S295 by, for example, flashing a display of the display circuit 65, and the processing proceeds to S300 and subsequent steps.

In this embodiment, the mode selection switch 66 is used to choose between the recording of only the first information in use of the positive film, or the recording of the first and second information.

FIG. 7 shows examples of sequences of information recording. FIG. 7(A) shows an example of recorded on a negative film. A code representing START is first recorded. Next, information about date, time, and title is recorded subsequent to a code representing ID="1", and information about print number, top/bottom, ON/OFF of the flash and BV is recorded subsequent to a code representing ID="2". Then, information about magnification and the light source is recorded subsequent to a code representing ID="2'", and information representing END is recorded finally.

FIG. 7(B) shows an example of recording on a positive film. A code representing START is first recorded, information about date, time, and title is recorded subsequent to a code representing ID="1", and finally, information representing END is recorded.

The comparison between FIG. 7(A) and FIG. 7(B) reveals that the positive film without information representing ID="2" and ID="2'", can use areas, where the information is to be recorded, to record information representing ID="1".

FIG. 7(C) and 7(D) show other recording examples. In a negative film recording example of FIG. 7(C), a code representing START is first recorded. Then, information such as date, time, and title is recorded subsequent to a code representing ID="1", information such as the print number, top/bottom, ON/OFF of the flash and BV is recorded after a code representing ID="2", and information, such as the shutter speed value, the aperture value and the exposure compensation value is recorded subsequent to a code representing ID="1'". Finally, information representing END is recorded.

In a positive film recording example in FIG. 7(D), a code representing START is first recorded. Then, information such as date, time, and title is recorded subsequent to a code representing ID="1", and information, such as the shutter speed value, the aperture value, and the exposure compensation value is recorded subsequent to a code representing ID="1'". Finally, information representing END is recorded.

The comparison between FIG. 7(C) and FIG. 7(D) also reveals that the positive film without information representing ID="2", can use an area, where the information is to be recorded, to record information representing ID="1".

In the above examples, the information ID="1" includes date, time and title as information representing the photographing state, the information ID="1'" includes the shutter speed value the aperture value and the exposure compensation value as information representing the state in photographing. The information ID="2" includes the print number, top/bottom, flash ON/OFF status and BV as information useful for printing. The information ID="2'" includes the magnification and the light source as information useful for printing. However, needless to say, the present invention is not limited to these examples. The information may include other information, and combinations of IDs and items that are previously decided.

TABLE 1

|  | First Information | | Second Information | |
| --- | --- | --- | --- | --- |
|  | ID = "1" | ID = "1'" | ID = "2" | ID = "2'" |
| Date | o | | | |
| Time | o | | | |
| Title | o | | | |
| Print Number | | | o | |
| Top/Bottom | | | o | |
| Flash ON/OFF | | | o | |
| BV | | | o | |
| Shutter Speed Value | | o | | |
| Aperture Value | | o | | |
| Exposure Compensation Value | | o | | |
| Magnification | | | | o |
| Light Source | | | | o |

What is claimed is:

1. A camera having a recording head for recording information in a magnetic recording area provided on a film, comprising:
   an information recording control circuit operable in a first mode for controlling said recording head to record predetermined information in said magnetic recording area, and in a second mode for controlling said recording head to prohibit recording of said predetermined information, and wherein said control circuit also controls said recording head to record other information different from said predetermined information in the second mode; and
   a selection circuit for selecting the first mode or the second mode according to the type of film loaded in said camera.

2. A camera according to claim 1, wherein said control circuit also controls said recording head to record said other information different from said predetermined information in the first mode.

3. A camera according to claim 1, wherein said control circuit controls said recording head to record information belonging to a first information group including said predetermined information in the first mode, and prohibits recording of said information belonging to said first information group including said predetermined information in the second mode.

4. A camera according to claim 3, wherein said control circuit controls said recording head to record information belonging to a second information group different from said first information group in the second mode.

5. A camera according to claim 4, wherein said control circuit controls said recording head to record said information belonging to said second information group different from said first information group in the first mode.

6. A camera according to claim 1, wherein said selection circuit selects the second mode when the film is a positive film type.

7. A camera according to claim 2, wherein said selection circuit selects the second mode when the film is a positive film type.

8. A camera according to claim 3, wherein said selection circuit selects the second mode when the film is a positive film type.

9. A camera according to claim 5, wherein said selection circuit selects the second mode when the film is a positive film type.

10. A camera according to claim 1, wherein said predetermined information is useful in a printing operation.

11. A camera according to claim 3, wherein said predetermined information is useful in a printing operation.

12. A camera according to claim 6, wherein said predetermined information is useful in a printing operation.

13. A camera according to claim 8, wherein said predetermined information is useful in a printing operation.

14. A camera according to claim 2, wherein said predetermined information is useful in a printing operation and said other information indicates a photographing state.

15. A camera according to claim 5, wherein said predetermined information is useful in a printing operation and said other information indicates a photographing state.

16. A camera according to claim 14, wherein said selection circuit selects the second mode when the film is a positive film type.

17. A camera according to claim 15, wherein said selection circuit selects the second mode when the film is a positive film type.

18. A camera according to claim 7, further comprising:
manual selection operation means for manually operating said selecting means to select the first mode or the second mode independent of an operation of said selection circuit when said film is a positive film type.

19. A camera according to claim 9, further comprising:
manual selection operation means for manually operating said selecting means to select the first mode or the second mode independent of an operation of said selection circuit when said film is a positive film type.

20. A camera having a recording head for recording information in a magnetic recording area provided on a film, comprising:

an information recording control circuit operable in a first mode for controlling said recording head to record predetermined information in said magnetic recording area, and in a second mode for controlling said recording head to prohibit recording of predetermined information, and wherein said control circuit controls said recording head to record other information different from said predetermined information in the first mode, and also to record said other information in the second mode;

selection means for manually selecting the first mode or the second mode in accordance with a photographer's choice; and warning means for giving a warning when the film is a positive film type and the first mode is selected by said selection means.

* * * * *

UNITED STATES PATENT AND TRADEMARK OFFICE
CERTIFICATE OF CORRECTION

PATENT NO. : 5,815,753
DATED : September 29, 1998
INVENTOR(S) : KENICHIRO AMANO

It is certified that error appears in the above-identified patent and that said Letters Patent is hereby corrected as shown below:

On the title page,
At [56] References Cited

"5,396,305 3/1995 Ogawa" should read
--5,396,305 3/1995 Egawa--.

Column 1

Line 29, "reference" should read --references--.

Column 2

Line 13, "only" should be deleted.

Column 3

Line 19, "recording" should read --recorded--.

Line 40, "direction" should read --direction is--.

UNITED STATES PATENT AND TRADEMARK OFFICE
CERTIFICATE OF CORRECTION

PATENT NO. : 5,815,753
DATED : September 29, 1998
INVENTOR(S) : KENICHIRO AMANO

It is certified that error appears in the above-identified patent and that said Letters Patent is hereby corrected as shown below:

Column 5

Line 19, "recording" should read --recorded--; and "recorded" should read --recording--.

Line 43, "information," should read --information--.

Line 50, "time," should read --time--.

Signed and Sealed this

First Day of June, 1999

*Attest:*

Q. TODD DICKINSON

*Attesting Officer*     Acting Commissioner of Patents and Trademarks